Figure 1:
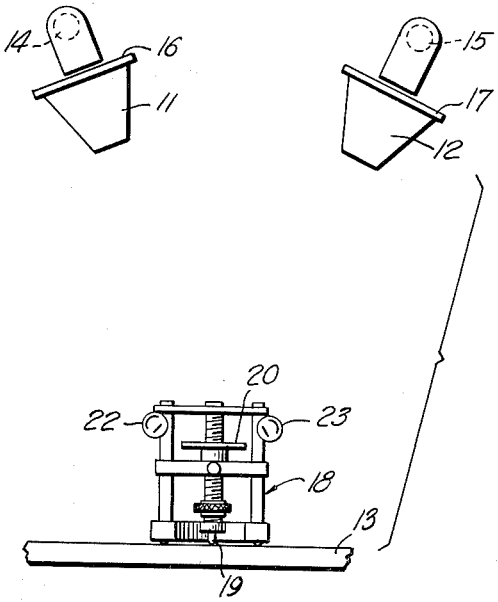

April 11, 1961

J. H. WATSON 2,978,954

AUTOMATIC PROJECTOR CONTROL APPARATUS FOR
PHOTOGRAMMETRIC INSTRUMENTS

Filed Dec. 10, 1959

INVENTOR

Joseph H. Watson

BY Mason, Fenwick & Lawrence

ATTORNEYS

United States Patent Office 2,978,954
Patented Apr. 11, 1961

2,978,954

AUTOMATIC PROJECTOR CONTROL APPARATUS FOR PHOTOGRAMMETRIC INSTRUMENTS

Joseph H. Watson, Fairfax, Va., assignor to Watson Electronics & Engineering Co., Inc., Arlington, Va., a corporation of Virginia Filed Dec. 10, 1959, Ser. No. 858,807

4 Claims. (Cl. 88—24)

The present invention relates to devices for automatically controlling the intensity of illumination of the projected images produced by a plurality of optical projectors in photogrammetric plotting instruments of the type used to project stereoscopic pairs of projection transparencies or diapositives taken from an aerial camera in the making of planimetric and topographic maps.

The most common forms of automatic stereoscopic plotting instruments for making contour maps from aerial photographs employ at least a pair of optical projectors for projecting images of projector transparencies or diapositives produced from a stereoscopic pair of photographic records onto a measuring device such as a tracing stand having a platen or screen which is adjustable vertically to effect detection of points of intersection of corresponding rays in the projections in the formation of a scale-spatial model of the area covered by the aerial photographs. The tracing stand is movable about the map table, drawing board, or other plotting surface to permit construction of the topographic map. The projection images are usually dichromatic projections or polarized projections, and the operator views the projected images by reflection through colored or polarizing filters to provide the proper image separation to the two eyes of the viewer.

The need for controlled lighting to provide substantially constant and balanced illumination on the tracing stand for all types of stereo-mapping instruments has long been recognized. Control of the projector illumination intensity to effect such balanced illumination becomes necessary because, as the tracing stand is moved about the map table or drawing board, the platen or screen on the tracing stand assumes different distances from the several projectors, which produce substantial variation in the intensity of the image formed on the tracing stand platen in relation to the differences between the lengths of the light projection paths from the several projectors to the tracing stand platen. Also, control of illumination to effect balance is required frequently during operation of the stereo-mapping instruments due to the varying densities in different areas of the projector transparencies. The common practice for correcting this situation to provide for balanced illumination at the tracing stand has been to provide rheostat controls for the projector lamps which must be continually adjusted by the operator during the plotting operation. With such devices, therefore, the operator is continuously encumbered by the need for manual adjustment of the rheostats controlling the projector lamp intensity, resulting in consumption of time with non-map plotting activities and inaccuracy induced by distraction with the adjustment of the rheostats.

An object of the present invention is to provide novel light intensity control means for stereoscopic photogrammetric plotting instruments and the like which will automatically maintain constant and balanced illumination at the tracing stand.

Another object of the present invention is the provision of automatic projector light intensity control means for a pair of projectors for stereoscopic plotting apparatus, which is responsive to the relative light intensities at the tracing stand of the projected light rays from the two projectors and applies control voltages to the energizing circuits for the two projector lamps to maintain the light intensities in preselected balance.

Another object of the present invention is the provision of photosensitive control means for use with stereoscopic plotting instruments and the like of the type having a plurality of projectors for imaging a stereoscopic pair of photographic records onto a tracing stand platen, wherein the intensity control means is automatically responsive to the relative intensity of the projected light from each of the two projectors to control the intensity of electrical excitation of the projector lamps and constantly maintain a preselected balance between them.

Other objects, advantages and capabilities of the present invention will become apparent from the following detail description, taken in conjunction with the accompanying drawing illustrating one preferred embodiment of the invention.

Figure 2:
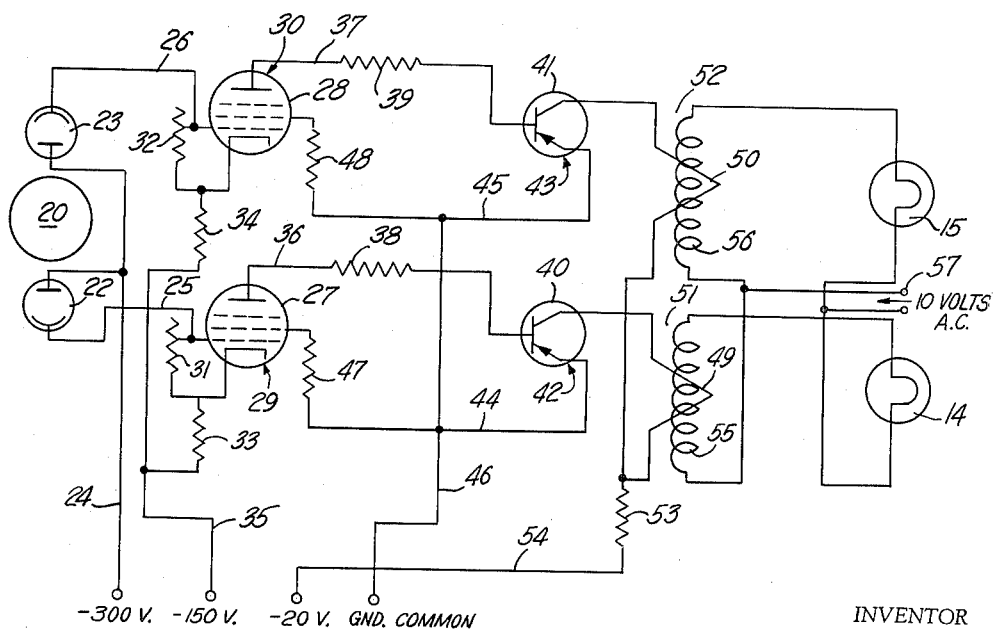

In the drawing:

Figure 1 is a diagrammatic illustration of an exemplary association of light intensity control means embodying the present invention with the tracing stand and projector lamps of stereoscopic plotting apparatus; and Figure 2 is a schematic diagram of an exemplary form of an electrical circuit for the light intensity control means.

Referring initially to Figure 1 of the accompanying drawing, the electronic control circuit illustrated schematically in Figure 2 is designed to sample the light projected from each of a pair of optical projector units diagrammatically illustrated in Figure 1 and indicated by the reference characters 11 and 12 forming part of an automatic stereoscopic photogrammetric plotting instrument of any of the many conventional types which are presently available on the market. It will be understood that such stereoscopic photogrammetric plotting instruments generally comprise a pair of optical projector units of the general type indicated at 11 and 12 which are adjustably supported on a frame above a suitable mapping table as indicated at 13, the projector units 11 and 12 each having a projector lamp 14, 15 associated therewith and a holder for projector transparencies or diapositives indicated at 16, 17, to project images of the diapositives through suitable condenser lenses and projection lenses onto the mapping table surface. In the following description, it will be assumed that dichromatic projection and observation is utilized to obtain image separation for stereoscopic viewing, wherein a red filter is incorporated in the optical projector unit 11 and a blue filter in the projector unit 12, and the operator views the projected image through colored filters, one allocated to each eye, so that one eye sees only the image projected by the unit 11 and the other eye sees only the image projected by the unit 12. It will be realized, of course, that other schemes for image separation can be used, such as polarizing filters or flicker systems or the like.

A tracing stand indicated by the reference character 18 is arranged for movement about the mapping table 13 in the image area, which includes a marking stylus 19 to mark contour lines on the paper or other recording medium supported on the mapping table 13 and a platen or screen 20 which is vertically adjustable by means of a screw and knurled nut indicated at 21 to position the platen 20 at various vertical levels to produce coincidence at selected elevations of corresponding portions in the two projected images representing terrain levels or objects of equal elevation for the formation of topographic plots. It will be also understood by those skilled in the art that as the tracing stand 18 is moved about the plotting area and the platen 20 is adjusted to different vertical positions, the distances along the projection axes from the platen 20 to the lamps 14 and 15 of the two projector units 11, 12 will differ. In some instances the ray path of the projector 11 will be much shorter than that of the projector 12, as when the tracing stand 18 is on the portion of the mapping table 13 directly below the projector unit 11, and that the opposite condition will obtain when the tracing stand 18 is below the projector 12. Since the intensity of light diminishes with distance, this will obviously produce a substantial unbalance at the surface of the platen 20 between the light intensity of the image projected by the unit 11 and the intensity of the image projected by the unit 12. Also as the platen 20 and tracing stand 18 are moved into different areas of projected images, variation in the density of the photograhpic records may produce marked differences in the light intensity.

In order to maintain the light intensity at the platen 20 emanating from the two projectors in constant balance without the necessity of manual adjustment of rheostats or other manual control devices for regulating projector lamp intensity, a pair of photocells designated by the reference characters 22 and 23 are also supported on the tracing stand 18 in flanking relation to the platen 20 and spaced slightly above the upper surface of the platen to sense the light intensity at the platen emanating from the two projector units 11, 12. The photocell 22 has been here designated as the red photocell, and may be, for example, a CL-3 photocell and the photocell 23 is designated as the blue photocell and may be a CL-2-P photocell. These photocells 22, 23 are each intercoupled through lead 24 to a —300 volt D.C. supply obtained from a conventional power supply and are intercoupled through leads 25 and 26 with the control grids of high impedance hard tube pentodes 27, 28 in preamplifier stages 29, 30. These pentodes may be, for example, 6DK6 tubes. A 10K ohm adjustable potentiometer 31 intercoupled between the control grid and cathode of the pentode 27 and a 100K ohm potentiometer is coupled between the grid and cathode of pentode 28, and the cathodes are coupled through 150 ohm cathode biasing resistors 33, 34 to a —150 volt D.C. source. The differences in the values of the two potentiometers 31, 32 is to properly proportion them to the characteristics of the photocells 22, 23. The plates of the pentodes 27, 28 are coupled through leads 36 and 37 and 150 ohm resistors 38, 39 to the bases of transistors 40, 41 in transistor current amplifier stages 42, 43. The transistors 40, 41 may be 2N378 transistors, the emitter of the transistors being coupled through leads 44 and 45 to a ground common 46 at the power supply and through 1500 ohm resistors 47, 48 to the screen grids of the pentodes 27, 28. The collectors of the transistors 42, 43 are coupled through the control windings 49, 50 of saturable reactors 51, 52 and a 75 ohm load resistor 53 in a common lead 54 to a —20 volt D.C. supply. The alternating current windings 55, 56 of the saturable reactors 51, 52, are intercoupled in series with their associated red and blue projector lamps 14, 15 across terminals 57 connected to a 10 volt A.C. supply.

Normal operation calls for initial adjustment of the red and blue potentiometers 31 and 32 to achieve a light intensity balance when the tracing stand 18 is disposed at the center of the projected spatial model or the image area on the mapping table 13. In this condition, the transistors 40, 41 are both at a new median state of conduction. If then the tracing stand 18 is moved toward the red projector 11, the red photocell 22 will sense more light than the blue photocell 23, since the projection path for the red light is shorter, and the red amplifier stage 29 will be biased to a more negative value due to the increased conduction through the red photocell 22 and the greater IR drop across the potentiometer 31. The blue cell 23 will sense a lower light intensity and produce a smaller IR drop across the potentiometer 32, thereby making the bias on the control grid of the pentode 28 less negative. This condition results, by current amplification of the power transistors 40 and 41, in less current flow through the reactor control winding 49 of the red saturable reactor 51 and more current flow through the reactor control winding 50 of the blue saturable reactor 52.

A saturable reactor will reflect higher impedance into its secondary or alternating current circuit with a decrease in control winding current and vice versa. Thus, the reduced current flow through the control winding 49 of the red saturable reactor 51 reflects a higher impedance in the circuit of the alternating current winding 55 resulting in a lower voltage to the red projector lamp 14 due to the reactor 51 being in series with the 10 volt A.C. supply voltage and the projector lamp 14. It will be seen that an increase in the light intensity on the blue photocell 23 will similarly reduce conduction through the blue preamplifier stage 30 and power transistor stage 43 to reduce current flow through the blue control winding 50 and reflect higher impedance into the secondary circuit of the reactor 52 reducing the exciting voltage to the blue projector lamp 15.

In addition, it will be noted that the load resistor 53 for the two transistor amplifiers 42, 43 is common to the two transistor amplifier stages and is unbypassed, resulting in a degenerative action between these amplifiers. That is to say, as the tracing stand 18 moves nearer to the red projector 11 and the blue photocell 23 receives less light and therefore attains a lower state of conduction, the current through the blue transistor amplifier 43 increases to a level near saturation, while the current through the red transistor amplifier 43 reduces. During the early phases of this change in relative conduction levels, until the current level in the blue transistor reaches saturation, the current increase in the blue transistor amplifier 43 is greater than the current reduction in the red transistor amplifier 42, producing a net gain in current through the common load resistor 53 and a greater voltage drop through the common load resistor 53. The increase in the voltage drop across the common load resistor 53 therefore produces a reduction in the voltage to the collectors of both of the transistors 40 and 41. Due to the fact that the blue transistor amplifier is driven to a state of high conduction at saturation current level, the reduction in voltage produced by the increased voltage drop across the load resistor 53 does not then effect any appreciable change in the blue reactor control winding 50 and transistor 41. However, the red transistor amplifier 42 which has been driven to a low state of conduction by the action of the red photocell 22 in response to greater light intensity, tends to draw even less current due to the decrease in voltage applied to its collector. Thus the reduction in current through the red reactor control winding 49 and the increase in impedance in the secondary circuit of the red reactor 51 is greater than the changes in current and impedance encountered by the blue reactor 52 in the case just described, producing relatively greater change in the exciting voltage supplied to the red projector lamp 14. If the tracing stand 18 is moved nearer the blue photocell 23, the reducing primary current and increasing secondary impedence at the blue reactor 52 undergoes greater change than the increasing primary current and reducing secondary impedence at the red reactor 51, producing a greater change in the exciting voltage supplied to the blue projector lamp 15. This circuit, therefore, results in a degenerative balance between the red and blue circuits at any time.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for automatically controlling the intensity of superposed projected images on a movable screen from a plurality of projector units of stereoscopic photogrammetric plotting instruments and the like to maintain image balance at the screen over a substantial range of screen positions comprising a number of projector control channels corresponding to the number of projector units, each of said control channels including a photocell dominantly responsive to the light intensity of the image on the screen projected by its associate projector unit, a saturable reactor having a primary control winding and a secondary winding for varying the exciting voltage applied to the light source for the associated projector unit in response to variation in the current flowing in the primary control winding, means intercoupling the photocell and primary control winding of the saturable reactor for each channel to vary the current in the control winding in response to variation in light intensity sensed by the intercoupled photocell in a direction to provide substantially constant and balanced illumination of the image at said screen emanating from each of the projectors, and means interconnecting said channels to produce degenerative action in the current variations in the primary control windings of the control channels.

2. Apparatus for automatically controlling the intensity of superposed projected images on the platen of a photogrammetric tracing stand from red and blue projector units of stereoscopic photogrammetric instruments and the like to maintain light intensity balance and uniform illumination at the platen over a substantial range of platen positions comprising a red sensitive photocell responsive to the projected light intensity of the image projected by the red projector unit onto the platen, a blue sensitive photocell responsive to the projected light intensity of the image projected by the blue projector onto the platen, a saturable reactor associated with said red sensitive photocell having a secondary winding intercoupled with the light source for the red projector and a primary control winding, a saturable reactor associated with said blue sensitive photocell having a secondary winding intercoupled with the light source for the blue projector and a primary control winding, a current amplifier stage intercoupled with each of said primary control windings and responsive to one of said photocells for varying the current through the reactor primary control windings in accordance with the relative light intensities sensed by the photocells associated therewith to vary the energizing voltages to said light sources in directions to decrease the energizing voltage to the light source of the projector unit nearest the platen during movement of the tracing stand relative to the projector units, and means intercoupling said current amplifier stages with each other to produce relatively greater current variation in the reactor control winding undergoing current reduction.

3. Apparatus for automatically controlling the intensity of superposed projected images on a movable screen from a pair of projector units of stereoscopic photogrammetric plotting instruments and the like to maintain image balance at the screen over a substantial range of screen positions comprising a pair of projector control channels, each of said control channels including a photocell dominantly responsive to the light intensity of the image on the screen projected by its associated projector unit, a saturable reactor having a primary control winding and a secondary winding for varying the exciting voltage applied to the light source for the associated projector unit in response to variations in the current flowing in the primary control winding, a plurality of current amplifier stages each intercoupled with one of said primary control windings and the associated photocell and responsive to the level of conduction through the associated photocell to vary the current in the control winding in a direction to provide a selected balance of illumination of the image at said screen emanating from each of the projectors, said current amplifier stages being coupled through said reactor control windings and a common load resistor to a common source of potential and one of said current amplifier stages being biased to a level of current saturation when its associated photocell is in a selected range of distances from the associated projector unit whereby a greater change is effected in the current through the reactor control winding associated with the other current amplifier stage.

4. Apparatus for automatically controlling the intensity of superposed projected images on a movable screen from a pair of projector units of stereoscopic photogrammetric plotting instruments and the like to maintain image balance at the screen over a substantial range of screen positions comprising a pair of projector control channels, each of said control channels including a photocell dominantly responsive to the light intensity of the image on the screen projected by its associated projector unit, a saturable reactor having a primary control winding and a secondary winding for varying the exciting voltage applied to the light source for the associated projector unit in response to variations in the current flowing in the primary control winding, a plurality of transistor current amplifier stages each intercoupled with one of said primary control windings, a preamplifier stage coupled between each of said current amplifier stages and its associated photocell having its control grid bias controlled by the state of conductivity of the photocell to vary conduction through the current amplifier stages and control windings in a direction to provide a selected balance of illumination of the image at said screen emanating from each of the projectors, the collectors of said current amplifier transistors being coupled through said reactor control windings and a common load resistor to a common source of potential and one of said current amplifier stages being biased to a level of current saturation when its associated photocell is in a selected range of distances from the associated projector unit whereby a greater change is effected in the current through the reactor control winding associated with the other current amplifier stage.

References Cited in the file of this patent

UNITED STATES PATENTS

| | | |
|---|---|---|
| 2,283,226 | Porter | May 19, 1942 |
| 2,803,751 | Hechler | Aug. 20, 1957 |
| 2,923,826 | Brumley | Feb. 2, 1960 |